(12) United States Patent
Steiner

(10) Patent No.: US 9,141,644 B2
(45) Date of Patent: *Sep. 22, 2015

(54) AFFINITY BASED RANKED FOR SEARCH AND DISPLAY

(71) Applicant: Google Inc., Mountain View, CA (US)

(72) Inventor: Matthew S. Steiner, Mountain View, CA (US)

(73) Assignee: Google Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/076,422

(22) Filed: Nov. 11, 2013

(65) Prior Publication Data

US 2014/0188857 A1 Jul. 3, 2014

Related U.S. Application Data

(63) Continuation of application No. 13/170,077, filed on Jun. 27, 2011, now Pat. No. 8,606,776.

(60) Provisional application No. 61/444,424, filed on Feb. 18, 2011.

(51) Int. Cl.
*G06F 17/30* (2006.01)

(52) U.S. Cl.
CPC ...... *G06F 17/30274* (2013.01); *G06F 17/3053* (2013.01); *G06F 17/30247* (2013.01); *G06F 17/30265* (2013.01); *G06F 17/30528* (2013.01); *Y10S 707/915* (2013.01)

(58) Field of Classification Search
CPC .................. G06F 17/30247; G06F 17/30265; G06F 17/30274; G06F 17/3053; Y10S 707/915
USPC .......................... 707/723, 748, 749, 752, 915
See application file for complete search history.

(56) References Cited

U.S. PATENT DOCUMENTS

| | | | | |
|---|---|---|---|---|
| 6,606,398 | B2 * | 8/2003 | Cooper ......................... | 382/118 |
| 7,716,140 | B1 * | 5/2010 | Nielsen et al. ................ | 705/319 |
| 7,836,050 | B2 * | 11/2010 | Jing et al. ...................... | 707/728 |
| 7,945,653 | B2 | 5/2011 | Zuckerberg et al. | |

(Continued)

OTHER PUBLICATIONS

Carthy, Face.com Brings Facial Recognition to Facebook Photos (We have Invites) [online] Mar. 24, 2009 [Retrieved on Mar. 15, 2012]. Retrieved from the Internet <URL: http://techcrunch.com/2009/03/24/facecom-brings-facial-recognition-to-facebook-photos-we-have-invites>.

(Continued)

*Primary Examiner* — Phong Nguyen
(74) *Attorney, Agent, or Firm* — Fish & Richardson P.C.

(57) ABSTRACT

Methods, systems, and apparatus, including computer programs encoded on a computer storage medium, for affinity based ranking and display of digital photographs. In one aspect, a method includes receiving an identifier that identifies a first user; accessing data defining relationships of the first user to second users; accessing digital photographs; determining digital photographs that are each associated with one or more of the first user and the second users; for each digital photograph, generating a photograph score based on the association with one or more of the first user and the second users and corresponding affinity scores representing the relationships of the first user to the second users; ordering the digital photographs according photograph scores; and providing one or more of the digital photographs to a user device of the first user according to the order.

29 Claims, 5 Drawing Sheets

(56) References Cited

U.S. PATENT DOCUMENTS

| | | | |
|---|---|---|---|
| 7,949,611 B1* | 5/2011 | Nielsen et al. | 705/319 |
| 2002/0054089 A1 | 5/2002 | Nicholas et al. | |
| 2003/0184793 A1 | 10/2003 | Pineau | |
| 2005/0190273 A1 | 9/2005 | Toyama et al. | |
| 2005/0197846 A1* | 9/2005 | Pezaris et al. | 705/1 |
| 2008/0040475 A1* | 2/2008 | Bosworth et al. | 709/224 |
| 2008/0040673 A1 | 2/2008 | Zuckerberg et al. | |
| 2008/0270425 A1* | 10/2008 | Cotgreave | 707/100 |
| 2009/0282367 A1* | 11/2009 | Canis | 715/828 |
| 2010/0145941 A1* | 6/2010 | Vasudevan et al. | 707/736 |
| 2010/0312714 A1 | 12/2010 | Ourega | |
| 2011/0038512 A1 | 2/2011 | Petrou et al. | |
| 2011/0085710 A1* | 4/2011 | Perlmutter et al. | 382/118 |
| 2011/0182485 A1 | 7/2011 | Shochat et al. | |
| 2011/0317928 A1* | 12/2011 | Yabu et al. | 382/225 |
| 2011/0319058 A1* | 12/2011 | Ankolekar et al. | 455/414.1 |
| 2013/0282821 A1* | 10/2013 | Muriello et al. | 709/204 |

OTHER PUBLICATIONS

Chellappa and Zhou, Face Tracking and Recognition from Video in Handbook of Face Recognition (Chapter 8) (2nd Edition), Li & Jain (Eds), [online] 2011 [Retrieved on Mar. 15, 2012]. Retrieved from the Internet <URL: http://www.cs.hmc.edu/research/robotics/Handbook_of_Face_Recognition/chapter0.pdf>.

Face.com Brings Facial Recognition to Facebook Photos (We have Invites) ITI Technology Observatory—Noticias y opinión: Face.com Brings Facial Recognition T . . . [online] Mar. 15, 2012 [Retrieved on Mar. 15, 2012]. Retrieved from the Internet <URL: https://observatorio.iti.upv.es/resources/new/3686>.

Face.com Developers, Documentation :: User IDs & Namespaces [online] copyright 2010 [Retrieved on Mar. 15, 2012]. Retrieved from the Internet: <http://developers.face.com/docs/users/>.

Knies, Computers Working on Your Behalf, Microsoft Research [online] Mar. 3, 2010 [Retrieved on Mar. 15, 2012]. Retrieved from the Internet: <URL: http://research.microsoft.com/en-us/news/features/030310-behalf.aspx>.

Wiskott et al., Face Recognition by Elastic Bunch Graphic Matching† in *Intelligent Biometric Techniques in Fingerprint and Face Recognition*, eds. Jain et al. CRC Press, Chapter 11, pp. 355-396, 1999.

International Search Report and Written Opinion in International Application No. PCT/US2012/025455, mailed Jan. 2, 2013, 9 pages.

* cited by examiner

AFFINITY BASED RANKED FOR SEARCH AND DISPLAY

CLAIM OF PRIORITY

This application claims priority under 35 USC §119(e) to U.S. Patent Application Ser. No. 61/444,424, filed on Feb. 18, 2011, the entire contents of which are hereby incorporated by reference.

BACKGROUND

This specification relates to processes for digital information retrieval.

Existing electronic social networks provide users with tools for identifying other users with whom they have an interpersonal relationship (e.g., a "friend"). Two users generally declare their interpersonal relationship explicitly; an initiating user requests another to become a "friend", and the other user accepts or rejects the request. By accepting the request, the second user allows the software of the social network to establish an association between the initiating user's account and that of the other user. Once such an association is established, the two "friends" can see each other's status updates (e.g., typed notes, shared links to web pages, photo uploads). Social networking users commonly have dozens, hundreds, even thousands of such "friends".

Many social networks provide services for uploading, storing, and displaying digital photographs. However, as there are many users of social networks, there are many digital photographs related to those users. When any particular user wants to view photographs of other users, the user may have to conduct many searches to find photographs of interest, and after each search, the user may be presented with photographs that are of little interest to the user.

SUMMARY

This specification describes technologies relating to methods and techniques for searching and ranking digital files based on affinity scores that represent relationships of users in social circles.

In general, one innovative aspect of the subject matter described in this specification can be embodied in methods that include the actions of receiving an identifier that identifies a first user; accessing data defining relationships of the first user to second users; accessing digital photographs; determining digital photographs that are each associated with one or more of the first user and the second users; for each digital photograph, generating a photograph score based on the association with one or more of the first user and the second users and corresponding affinity scores representing the relationships of the first user to the second users; ordering the digital photographs according photograph scores; and providing one or more of the digital photographs to a user device of the first user according to the order. Other embodiments of this aspect include corresponding systems, apparatus, and computer programs, configured to perform the actions of the methods, encoded on computer storage devices.

Another innovative aspect of the subject matter described in this specification can be embodied in methods that include the actions receiving an identifier that identifies a first user; identifying a first group of one or more other users that the first user has identified as being members of the first user's social network; identifying a second group of one or more other users with whom the first user has communicated; determining a plurality of relationship strengths for the first user and at least one of the other users in the first and second groups; receiving one or more digital photographs; determining within the one or more digital photographs, the presence of images of the first user, other users in the first group, and other users in the second group; ranking the one or more digital photographs based on the determined presence of images of the first user, and the plurality of relationship strengths; and providing one or more of the ranked digital photographs. Other embodiments of this aspect include corresponding systems, apparatus, and computer programs, configured to perform the actions of the methods, encoded on computer storage devices.

Particular embodiments of the subject matter described in this specification can be implemented so as to realize one or more of the following advantages. Social networking users are provided with ranked lists that are based on the relative strengths of their relationships to other users. These ranked lists can include other users who are directly linked to the user, as well as other users who are indirectly linked to the user. The strength of a relationship between two users can be at least partly determined by the number of photos one user has taken of the other. The strength of a relationship between two users can be at least partly determined by which other users a user tags or identifies in photos, which other users' photos the user tags or identifies people in, which other users' photos the user is in, which other users' are in photos with the user, and other appropriate indicators of the relationship between the user and one or more other users. The strength of a relationship between two users can be at least partly determined by the amount of time that has passed since one user has tagged another in a digital photograph. The ranked lists can be used to determine a collection of photos that are presented to the user, in which the photos include images of the user and of other users with whom the user has relatively strong social relationships. Social networking users can be shown photos that they may find interesting. The ranked lists can be used to suggest other people for users to become friends with. The ranked lists can be used to identify promotions and/or advertisements that are of interest to users.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
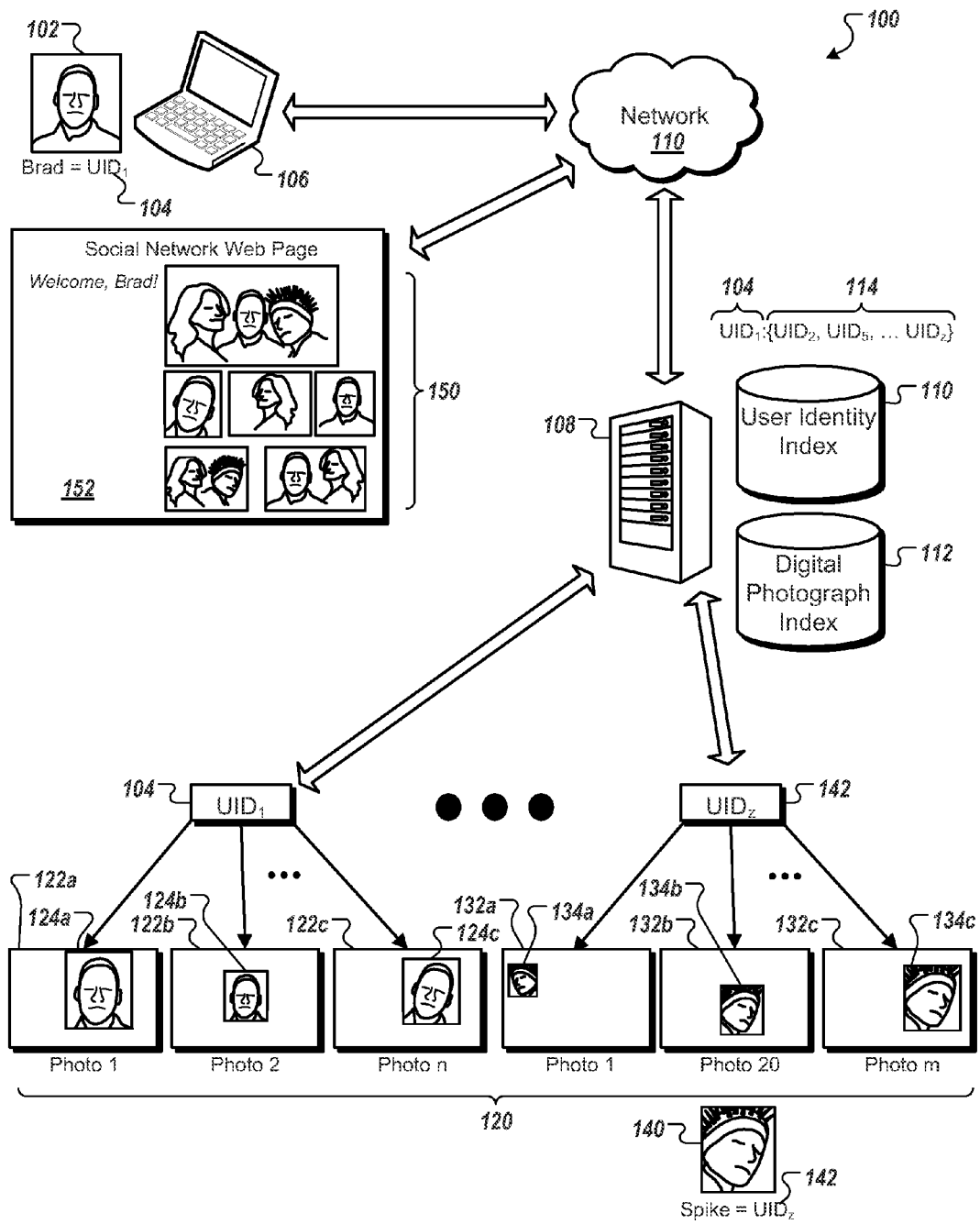
FIG. 1 is a block diagram of an example system for performing affinity-based ranking of digital files.

This document describes systems and techniques for ranking digital files that are associated with multiple users, such as digital photographs that include images of multiple individuals. In an example, users of a social networking service can identify collections of other users with whom they have social relationships, and these other users are commonly referred to as "friends". However, not all social relationships are equal. For example, the user may have very strong relationships with his/her spouse, siblings, and best friends, less strong relationships with co-workers, and relatively weak relationships with acquaintances or old friends with whom the user interacts only infrequently.

An affinity score represents an estimate of the strength of the relationship between two users. In some implementations, affinity scores may be at least partly estimated through information explicitly provided by the users. For example, users identified as spouses or family members may be predicted as having greater social affinity for each other than would be predicted for users who have identified each other as co-workers. In some implementations, the affinity scores may be at least partly estimated implicitly from the interactions between two users. For example, users who email or identify each other in digital photographs may have greater social affinity for each other than users who do not.

The social networking service is also capable of accepting, hosting, and presenting digital photographs or other electronic media that can be associated with one or more users. For example, a digital photograph can include the images of one or more users of a social circle. As used in this specification, social circles are based on categories of relationships of a user to other users. In some examples, the relationship can be implicit or explicit. For example, a user can assign their social networking contacts and better control the distribution and visibility of social networking posts.

In some implementations, as used in this specification, a social circle is provided as a data set defining a collection of contacts that are associated with one another in a computer-implemented social networking service. As used in this specification, generally a social circle can be described from the perspective of an individual that is the center of a particular collection of socially interconnected people, or from the aggregate perspective of a collection of socially interconnected people. In some examples, a social circle can have narrowly defined boundaries. For example, some social circle may have members that are familiar with one another, and permission may be required for a member to join a social circle. In some implementations, a user of the social networking service define a social circle, and the social circle, as a data set defining a collection of contacts, may reflect a real-life social circle of the user. These are examples of social circles as used in the specification. However, social circles need not be limited to these examples.

Examples of groups identified by implicit relationships are users that are implicitly identified so as to form a group that is distinct from the larger group of all users. Such implicit relationships can be based on frequent contact between the user and other users, the co-occurrence of the user and other users in photographs, users that the user photographs, and users that have photographed, to name just a few.

Users may identify, or "tag", themselves or other users in digital photographs hosted by the social networking service, and have those user tags associated with the photos. In some cases, the strength of the social relationship between two users can be determined at least partly from such tagging activity. For example, a user may take, upload, and tag photos another particular user often, and these actions may be indicative of a relatively strong social affinity between the two users. In another example, if a particular user is photographed and tagged often by another user, a relatively strong social affinity may also be inferred. In yet another example, if two users are known to appear together in photographs often, then a strong social affinity between the two may also be inferred.

In some implementations, the strengths of social affinities may be at least partly determined through other implicit indications. For example, users who email, cross-post, chat, or otherwise communicate often may have relatively strong social affinities for each other, and the frequency or volume of correspondence between them can be partly used to determine affinity scores.

The social networking service uses affinity scores to rank collections of digital photographs or other electronic media files. For example, a server computer system can retrieve a collection of digital photographs and the tags associated with each. For each photograph in the collection, the server can retrieve a collection of user tags and corresponding affinity scores that are representative of the strengths of social relationships between a selected user and the users who are tagged in the photo. A photograph score is then determined based on the affinity scores and other factors that will be described below. Each photograph score for each photograph is used to rank the photographs in the collection of photographs. For example, the selected user may be initially presented with a collection of digital photographs that he or she is likely to enjoy more than other photographs that are ranked lower, since the photos include images of themselves and/or other users with whom the selected user has relatively strong social relationships.

In some implementations, the selected user may be presented with photographs of users with whom the selected user may wish to become friends with. For example, the server can present photographs of users with whom the selected user may be friends with in real life but not in the social networking service. In some implementations, the server can present photographs of users based on the selected user's preferences. For example, the selected user's profile may indicate that the selected user is "interested in men", and can be presented with a relatively higher number of photos of men than women. In another example, the selected user may indicate that he or she "likes" dancing and travelling, and can be presented with a relatively higher number of photos that depict other users dancing or other users' vacation photos.

FIG. 1 is a block diagram of an example system 100 for performing affinity-based ranking In the illustrated example, a user Brad 102 is identified by a user identifier "$UID_1$" 104. The user Brad 102 interacts with a computer device 106 (e.g., a personal computer, a cellular telephone, a pad computer, a tablet computer, a personal digital assistant) to access a server system 108 through a network 110 (e.g., a wireless or wired public network, such as the Internet). In some implementations, the server system 108 can be a single or collection of server systems performing the functions of a web server, a communications service, a social networking service, a digital photo hosting service, or other appropriate computer process.

The server system 108 includes a user identifier index 111 and a digital photograph index 112. The user identifier index 111 and the digital photograph index 112 are electronic file repositories or databases that can be used to store digital photographs and/or user identifiers. In some implementations, the digital photograph index 112 can store a large number of other digital photographs, such as photographs submitted by the user Brad 102, or photographs uploaded by other users of the server system 108.

In the illustrated example, the user Brad's 102 user identifier "$UID_1$" 104 is associated with a collection of user identifiers 114. The collection of user identifiers 114 is a collection of user identifiers that correspond to other users in the user Brad's 102 social circles. In some implementations, each social circle can define a list of users that include the user and one or more other users as a proper subset of users of a network, and a relationship of the user to the one or more other users, wherein at least one social circle can define an explicit relationship of the first user to one or more second users and at least one social circle can define an implicit relationship of the first user to one or more second users.

In some implementations, the explicit relationship can be of a predefined relationship type in a social network. For example, the explicit relationship may be indicated when a user adds another user to a contact list, "friends" another user, declares are martial or familial relationship to another user, or through the declaration of any other appropriate predefined relationship type that may be used to explicitly indicate the relationship between two users.

In some implementations, the implicit relationship may be based on user interactions between the first user and the second user over the network. For example, the implicit relationship may be indicated by the presence of digital photographs in the digital photograph index 112 in which two users appear together, by photos in which one user has been tagged by another user, by photos in which one user has been photographed by another user, and by photos of one user and uploaded by another user. In another example, the implicit relationship may be indicated by the volume or frequency of communications that have been detected between two users. In yet another example, the implicit relationship may be indicated by two users' memberships in a common social circle (e.g., two users who are members of a social networking "group", two users have individually chosen to "follow" a common other user or business or group).

Each identifier in the collection of user identifiers 114 has a corresponding affinity score (not shown) that represents the relative strength of the social relationship between the user Brad 102 and the other users in the user Brad's 102 social circles. Affinity scores and how they are used will be discussed further in the descriptions of FIGS. 2-4.

The server system 108 identifies a collection of digital photographs 120 that are stored in the digital photograph index 112 that include images that have been identified, or "tagged", as including images of or taken by the user Brad 102, and/or images of or taken by other users in the user Brad's 102 social circles. In the illustrated example, the collection of digital photographs 120 includes a collection of digital photographs 122a-122c that include images 124a-124c of the user Brad 102 and/or photos taken by the user Brad 102. The collection of digital photographs 120 also includes a collection of digital photographs 132a-132c that include images 134a-134c of a user Spike 140 and/or photos taken by the user Spike 140. The user Spike 140 is associated with the user identity "$UID_z$" 142.

For each photo in the collection of digital photographs 120, a photograph score (not shown) is determined by the server system 108. The photograph score for a selected photograph is determined by factors that include who is pictured in the photograph, who took the photograph, who is tagged in the photograph, the age of the photograph, the age of the tags in the photograph, and/or other appropriate factors that may be used to estimate a user's affinity for a selected photograph, and express that affinity as a photograph score. In some implementations, the photograph score can be at least partly determined from a pairwise score determined between the photograph viewer and at least one of the people identified in a photograph, the people who tagged a photograph, people who are the subject of a tag, the person who uploaded the photograph, the people who have commented on the photograph, or combinations of these and/or other people who have interacted with the photograph in any appropriate way. Photograph scores will be discussed further in the descriptions of FIGS. 2-4.

For a particular user identifier, the server system 108 ranks the collection of digital photographs 120 by their corresponding photograph scores. In the illustrated example, the server system 108 selects a collection of digital photographs 150 that includes a predetermined number of the highest-scoring photographs (e.g., digital photographs ranked from 1-10). The collection of digital photographs 150 is presented to the user Brad 102 in the form of a web page 152. As such, the strengths between the user Brad 102 and other users in his social circles is used to determine the collection of digital photographs 150 that the user Brad 102 may be most likely to enjoy viewing. Additional photographs can be presented to the user Brad 102 by, for example, the selection of a command for a set of the next highest-rated photographs, e.g., digital photographs ranked from 11-20).

Figure 2:
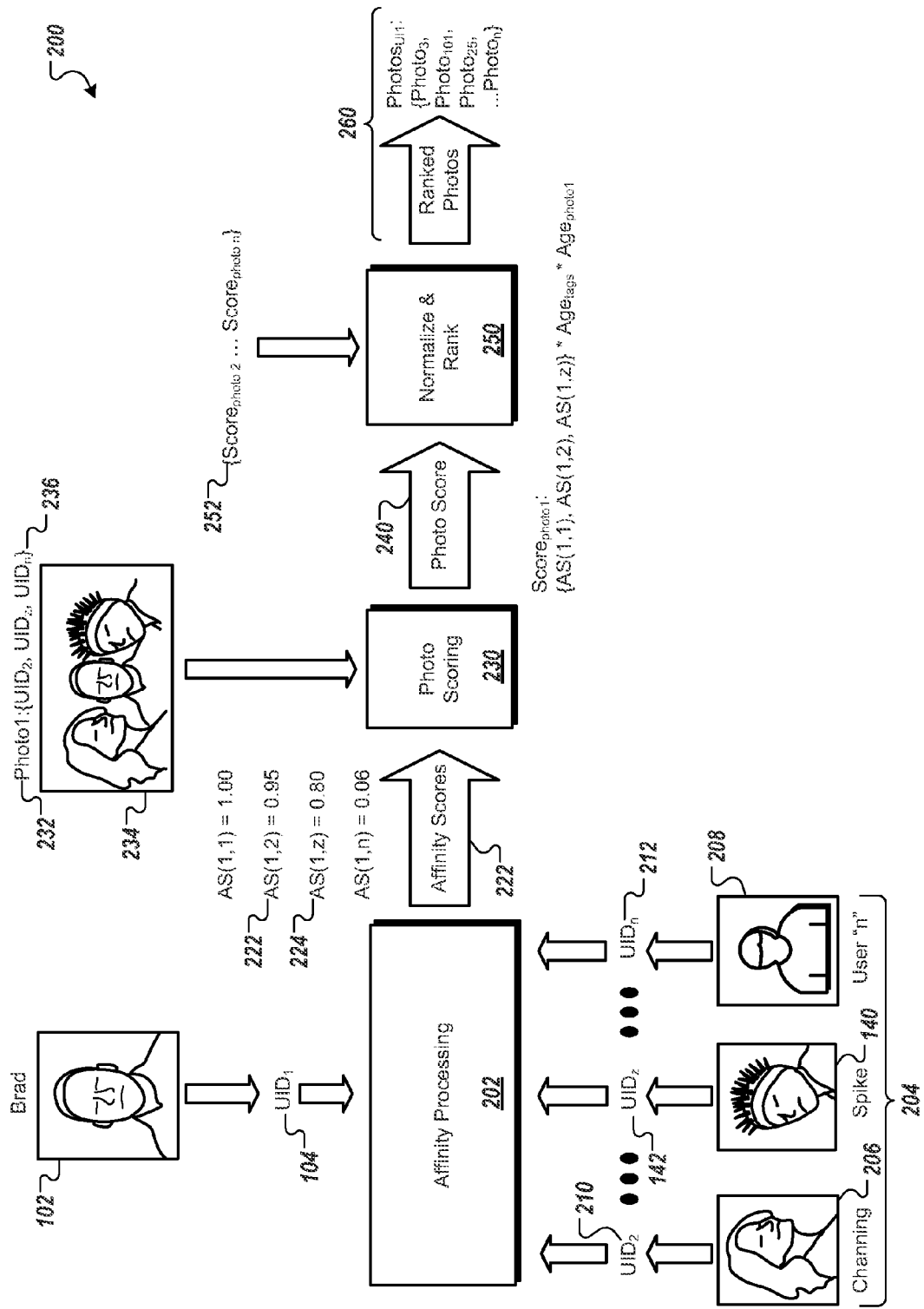
FIG. 2 is an example conceptual model for ranking digital photographs through affinity scores.

FIG. 2 is an example conceptual model 200 for ranking digital photographs through photograph scores. In some implementations, generating the photograph score for a digital photograph can include determining, for each relationship of a first user to a second user, an affinity score that measures the relationship of the first user to the second user based, in part, on a value that is proportional to a number of digital photographs of the second user taken by the first user. The scoring of photographs is determined with reference to a particular user identifier, i.e., the same digital photograph will likely received different scores when scored with reference to a first user identifier and when scored with reference to a second user identifier.

The user Brad's 102 user identifier "$UID_1$" 104 is processed by an affinity processing module 202 to determine a collection other users 204 in the user Brad's 102 social circles.

The collection of other users 204 includes a user Channing 206, the user Spike 140, and a "n" 208. The user Channing 206 is associated with a user identifier "$UID_2$" 210, and the user "n" is associated with a user identifier "$UID_n$" 212.

The affinity processing module 202 determines a collection of affinity scores 220, in which each affinity score represents an estimated measure of the strength of the social relationship between the user Brad 102 and individual users in the collection of other users 204. For example, an affinity score 222 can represent the strength of the social relationship between the user Brad 102 and the user Channing 206. In the illustrated example, the affinity scores are provided on a decimal scale that varies from zero to one, although in other implementations any appropriate scale can be used.

The affinity score 222, shown as "0.95" may be indicative of the fact that Brad and Channing have explicitly added each other to their respective social circles, and/or have explicitly identified to the social networking system that they are married to each other. The affinity score 222 may further elevated due to implicitly strong social affinities between the user Brad 102 and the user Channing 206, as indicated by user interactions between the two (e.g., frequent electronic message exchanges, frequent profile page views, etc.). The explicit and implicit affinities are combined to determine the corresponding affinity score.

In some implementations, generating the photograph score for digital photographs can comprise determining, for each relationship of the first user to a second user, an affinity score that measures the relationship of the first user to the second user based, in part, on a value that is proportional to a number of digital photographs of the first user taken by the second user. For example, the user Brad 102 may take and upload to the server system 108 a large number of photographs of the user Channing 206, and this large number of photographs may implicitly indicate a strong social affinity between the two users.

In some implementations, generating the photograph score for digital photographs can comprise determining, for each relationship of the first user to a second user, an affinity score that measures the relationship of the first user to the second user based, in part, on a value that is proportional to a number of digital photographs in which images of the first user and the second user co-occur. For example, since the user Brad 102 and the user Channing 206 are married in this example, they may often appear together in photos, which may also imply a strong social affinity between the two users. The co-occurrence can be determined by the presence of tags identifying the users in the photographs, by facial recognition techniques, metadata, or other techniques that can be used to identify persons in photographs.

In some implementations, the affinity score that measures the relationship of the first user to the second user can be further based, in part, on a time that each of the digital photographs of the second user taken by the first user was generated. For example, a photo taken recently may be given greater mathematical weight than may be given to older photos. In some implementations, the affinity score that measures the relationship of the first user to the second user can be further based, in part, on a time that that the first user tagged each of the digital photographs (e.g., a newly added tag may be given greater mathematical weight than may be given to older tags). For example, the user Spike 140 may tag a large number of photos of a new friend (not shown), which may raise an implicit portion of an affinity score between the two users and cause photos of the friend to appear more often (e.g. in the collection of digital photographs 150 of FIG. 1). As an extension of this example, the user Spike 140 and his friend later part ways (e.g., one moves away or they lose interest in each other), and this leads the two users to stop posting pictures of each other. As the existing tags age, the tags are given less mathematical weight, and the implicit portions of the affinity score between the user Spike 140 and the former friend become relatively weaker, which may cause photos of Spike's former friend to automatically appear less and less often in collections such as the collection 150.

In another example, an affinity score 224 represents the strength of the social affinity between the user Brad 102 and the user Spike 140. The relatively high score of "0.80" may be determined from the fact that Brad and Spike have explicitly added each other to their social circles, and have explicitly identified to the social networking system that they are brothers. However, the user Brad 102 and the user Spike 140 live hundreds of miles away from each other, and therefore may not take many pictures of each other, or appear together in photographs often, which may lower their implicit affinity. The implicit affinity between the user Brad 102 and the user Spike 140 may be boosted, however because, due to the distance between them, they may routinely email, message, or otherwise communicate with each other.

The user "n" 208 represents a user with whom the user Brad 102 has only a relatively weak relationship, as expressed by the affinity score 226 value of "0.06". For example, the user "n" 208 may be an old classmate who shares explicit affinity through common membership in a "high school reunion" social circle, but the two users may have little other contact with each other which may imply a relatively weak implicit relationship with each other. In some implementations, the affinity scores between two users may be temporarily altered due to implicit activities involving both users (e.g., after a high school reunion, the affinity scores may increase for a short while, and then decrease as time passes). For example, the affinity score between the user Brad 102 and the user "n" 208 may be weak initially, due in part to a lack of communication or photographic activity between the two. In the days leading up to the aforementioned high school reunion, the two may start corresponding more frequently (e.g., they are both on the planning committee), and the implicit portion of their affinity score may rise. At the reunion, the user Brad 102 and the user "n" 208 may take pictures of each other, or may be photographed together often. When these photos are uploaded to and tagged in the social networking system, the implicit portion of their affinity score may rise further. But as time passes, the two may communicate less often and the photos tags may age, causing the implicit portion of their affinity score to shrink again. As such, the overall affinity score between two users may change over time in a way that is at least partly reflective of the two users' social interactions with each other.

The affinity scores 222 are received by a photograph scoring module 230. The photograph scoring module 230 also receives a photograph identifier 232 for a digital photograph 234. The photograph identifier 232 is associated with a collection of user identifiers 236. The collection of user identifiers 236 includes the user identifiers for the users who have been tagged or otherwise identified as being in the photograph 234, performing the tagging of the photograph 234, taking the photograph 234, or uploading the photograph 234. The photograph scoring module 230 identifies the affinity scores that exist between the logged in user Brad 102 and substantially each of the users tagged in the photograph 234. The identified affinity scores are mathematically weighted against the age of the photograph 234 and/or the ages of the tags associated with the photograph 234 to determine a photograph score 240.

In some implementations, the score for the photograph can be based on, in part, on a linear combination of weighted affinity scores for all identified users for which a photograph interaction is identified, wherein each weight corresponds to a particular photograph interaction, e.g., $$\text{Score} = \text{Sum}(A(U1, Un) * Wn), n = 2 \ldots j$$

where:

U1 is a requesting user identifier;

Un is a user identifier of another user that is identified in the photo or that interacted with the photograph;

A(U1, Un) is an affinity score between U1 and Un; and

Wn is a weight associated with the user interaction with the photograph.

As used herein, a photograph interaction for a user occurs when the user is a subject of the photograph, or has otherwise interacted with the photograph (e.g., commented on the photograph, tagged the photograph, distributed the photograph as an owner, etc.). For example, assume that Alice provides a photo of Jim and Kim, and Bob, upon viewing Alice's photo, tags Jim in the photo. Cody also comments on the photo. Another users, Eve, requests phones. The score for Alice's photo would be based on the following:

Score=$A$(Eve, Bob)*weight of tagging +

(Eve, Jim)*weight of being in photo+

(Eve, Kim)*weight of being in photo+

(Eve, Alice)*weight of photo ownership+

(Eve, Cody)*weight of commenting

Although a summation is used, other operations can also be used.

Other data can also be used to generate a photograph score, such as photo metadata.

The photograph score 240 is received at a normalizing and ranking module 250. The normalizing and ranking module 250 also receives a collection of other photograph scores 252, which represent the photograph scores (e.g., determined by the photograph scoring module 230) determined for other photographs that are associated with the collection of other users 204 in the user Brad's 102 social circles. The photograph scores 240, 252 are then normalized to bring the photograph scores 240, 252 onto a common scale so they may be compared. The normalizing and ranking module 250 then ranks the photograph scores 240, 252, and provides a collection of ranked photograph identifiers 260.

In some implementations, the scoring, normalizing, and/or ranking of the photograph 234 may be performed at write time (e.g., when photos are uploaded, tagged, or otherwise modified), at read time (e.g., when viewed or accessed), and/or at some time after the photograph has been received. In some implementations, the photograph scoring, normalizing, and/or ranking of the photograph 234 may be performed periodically after the photograph 234 has been uploaded.

In some implementations, the normalizing and ranking module 250 may store, in a digital photograph index, data identifying a subset of the digital photographs, the subject identifying only the digital photographs having photograph scores that exceed a score threshold and indexed to the identifier that identifies the user. In some implementations, the score threshold can be the photograph score being one of a highest N photographs' scores, where N is a number that is less than a number of photograph scores generated for the user identifier. For example, the normalizing and ranking module 250 may identify and rank 1000 photographs that are known to be associated with the user identifier "$UID_1$", and store the 10, 20, 50, 100 or other appropriate number of highest-scoring photographs in the digital photograph index 112.

A similar operation can be done for digital photographs for other user identifiers. In some implementations an association of the digital photograph with a plurality of user identifiers may be stored in a digital photograph index for each digital photograph, wherein each user identifier can be a user identifier for which a photograph score for the digital photograph exceeded a score threshold. For example, as new photos are added and tagged in association with the user Brad 102, the identifiers for higher-scoring photographs may replace the identifiers for lower-scoring photographs in a collection of high-scoring photographs associated with the user Brad 102.

Figure 3:
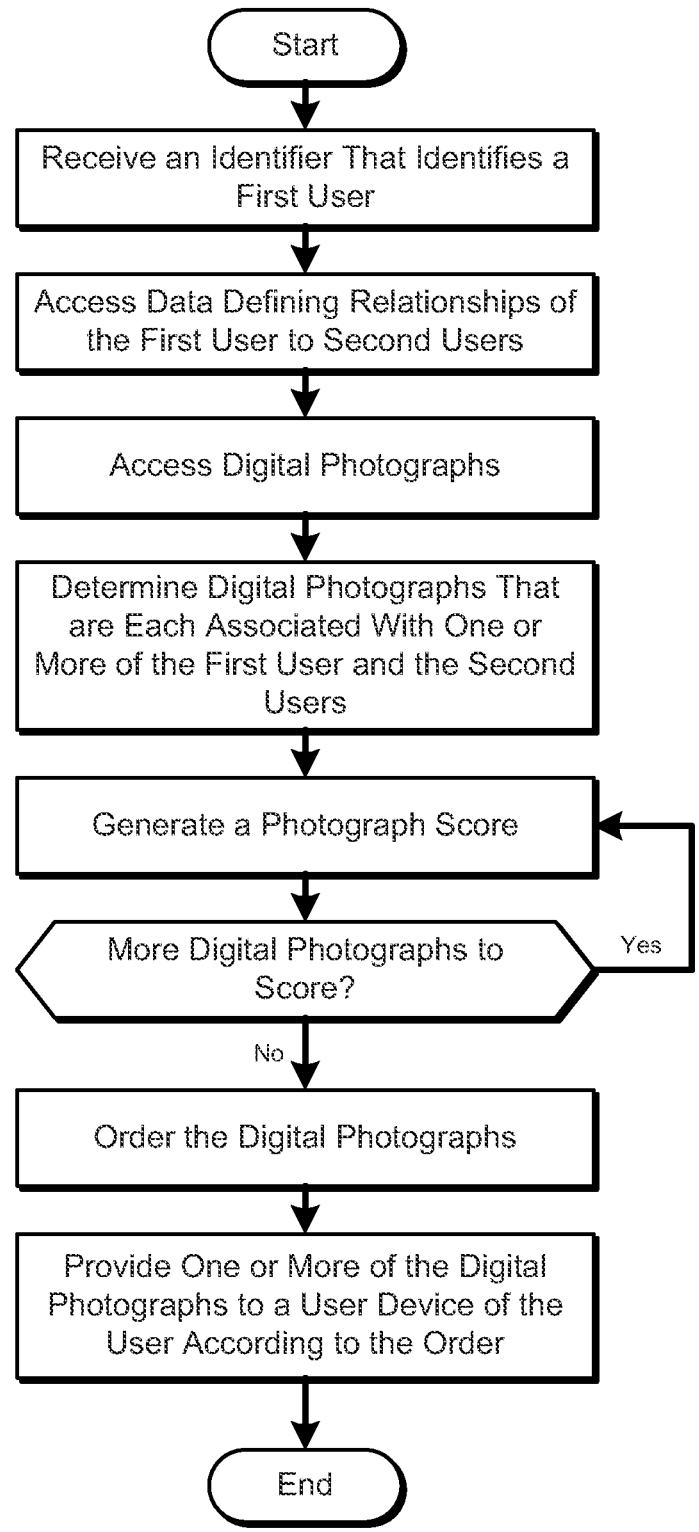
FIG. 3 is a flow diagram of an example process for affinity-based ranking of digital photographs.

FIG. 3 is a flow diagram of an example process 300 for affinity-based ranking of digital photographs. In some implementations, the processes 300 may be performed by the server system 108 of FIG. 1. In some implementations, the process 300 may be performed by the affinity processing module 202, the photo scoring module 230, and/or the normalization and ranking module 250 of FIG. 2. The process 300 can be done periodically or in response to a triggering event. For example, the process may be done on a periodic basis for each user identifier (e.g., daily), or when a user identified by the user identifier uploads a photograph.

The process 300 begins at step 310, at which an identifier that identifies a first user is received. For example, the user identifier "$UID_1$" 104 is received by the server system 108 of FIG. 1. At step 320, data defining relationships of the first user to second users is accessed. For example, the server system 108 accesses the user identifier index 111 to retrieve the collection of user identifiers 114. In some implementations, accessing data defining relationships of the first user to second users can include accessing data defining a plurality of social circles of the user. In some implementations, the social circles can define items including a list of users that include the user and one or more other users as a proper subset of users of a network, and a relationship of the user to the one or more other users, wherein at least one social circle can define an explicit relationship of the first user to one or more second users and at least one social circle can define an implicit relationship of the first user to one or more second users.

At step 330, digital photographs are accessed. For example, the server system 108 accesses the digital photograph index 112. At step 340, digital photographs that are each associated with one or more of the first user and the second users are determined. In some implementations, determining digital photographs that are each associated with one or more of the first user and the second users can include determining digital photographs that include images of one or more of the first user and second users. For example, the server system 108 determines, based on the user identifiers 114, that the collection of digital photographs 120 is associated with the user Brad 102 and one or more other users, such as the user Spike 140.

At step 350, one of the digital photographs is selected, and at step 360 a photograph score is generated based on the association with one or more of the first user and the second users and corresponding affinity scores representing the relationships of the first user to the second users. In some implementations, generating a photograph score based on the association with one or more of the first user and the second users can include generating the photograph score based on the images of first or second users that are determined to be included in the digital photograph and corresponding affinity scores representing the relationships of the first user to the second users. For example, the affinity processing module 202 of FIG. 2 determines the affinity scores between the user Brad 102 and the collection of other users 204, such as the user Channing 206, the user Spike 140, and the user "n" 208. The photo scoring module 230 generates the photograph score 240 for the photograph 234 based at least partly upon the affinity scores between the user Brad 102 and the other users 206, 140 in the photograph 234, and/or upon the identity of the user who took, uploaded, or tagged the photograph 234.

If, at step 370, it is determined that there are more digital photographs to score, then the process 300 continues at step 350. If however, it is determined that there are no more digital photographs to score, then at step 380 the digital photographs are ordered according to the photograph scores. For example, the normalization and ranking module 250 may normalize and rank the photographs according to their respective photograph scores 240, 252 to produce the collection of ranked photograph identifiers 260.

At step 390, one or more of the digital photographs are provided to a user device of the first user according to the order. For example, the server system 108 may use the collection of ranked photograph identifiers 260 to generate the web page 152, which includes the collection of digital photographs 150 arranged according to order of the identifiers in the collection of ranked photograph identifiers 260. The web page 152 is then provided to a user device (e.g., a computer device with a web browser) to be rendered for viewing by a user.

Figure 4:
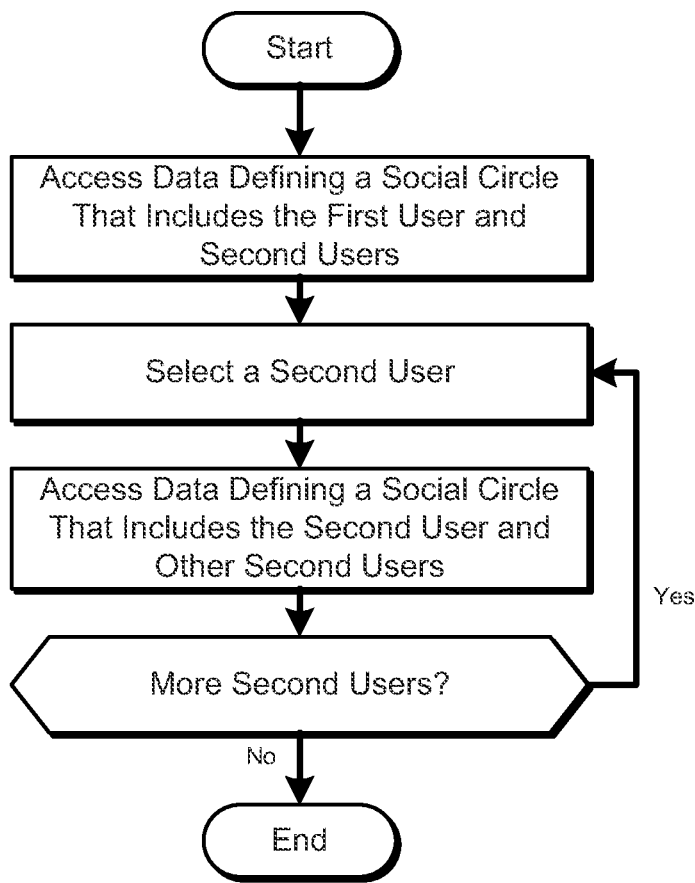
FIG. 4 is a flow diagram of an example process for accessing user data.

FIG. 4 is a flow diagram of an example process 400 for accessing user data. In general, the process 400 identifies second or higher order explicit relationships between users (e.g., friends of friends). In some implementations, the processes 400 may be performed by the server system 108 of FIG. 1. In some implementations, the process 400 may be performed by the affinity processing module 202, the photo scoring module 230, and/or the normalization and ranking module 250 of FIG. 2. In some implementations, the process 400 may be performed as part of the step 320 of FIG. 3.

The process 400 begins at step 410 in which data defining a social circle that includes the first user and second users is accessed, wherein each second user is explicitly related to the first user by a relationship that is explicitly defined by the first user and the second user. For example, the server system 108 may access the user identifier index 111 to retrieve the collection of user identifiers 114 that are associated with the user identifier "UID$_1$" 104. The user identifiers 114 can include user identifiers for users who have explicit, implicit, or both types of relationships to the user Brad 102. For example, the user Brad 102 and the user Spike 140 may have added each other to their contacts lists, "friended" each other, or have otherwise explicitly expressed to the server 108 an indication of their mutual social relationship.

At step 420, a second user is selected. For each second user that is explicitly related to the first user, at step 430 data defining a social circle that includes the second user and other second users is accessed, wherein each other second user is related to the second user by a relationship that is explicitly defined by the second user and the other second user. For example, the server system 108 can access the user identifier index 111 to retrieve information which indicates that the user Brad 102 has an explicit relationship with the user Spike 140, and the user Spike 140 may have an explicit relationship with a user Paul who may not have an explicit relationship to the user Brad 102.

If at step 440, there are more second users who have been identified, then the process continues at step 420. If not, then the process 400 ends.

In some implementations, the process 400 may also be performed based on the implicit relationships between users. For example, at step 410 each identified user may be implicitly, rather than explicitly, related to the first user. At step 430, for each second user that is implicitly related to the first user, data defining a social circle that includes the second user and other second users is accessed, wherein each other second user is related to the second user by a relationship that is implicitly defined by the second user and the other second user.

Although described in the context of photographs, the features described in this document can also be applied to other types of content, such as video.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. A computer storage medium can be, or be included in, a computer-readable storage device, a computer-readable storage substrate, a random or serial access memory array or device, or a combination of one or more of them. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

Figure 5:
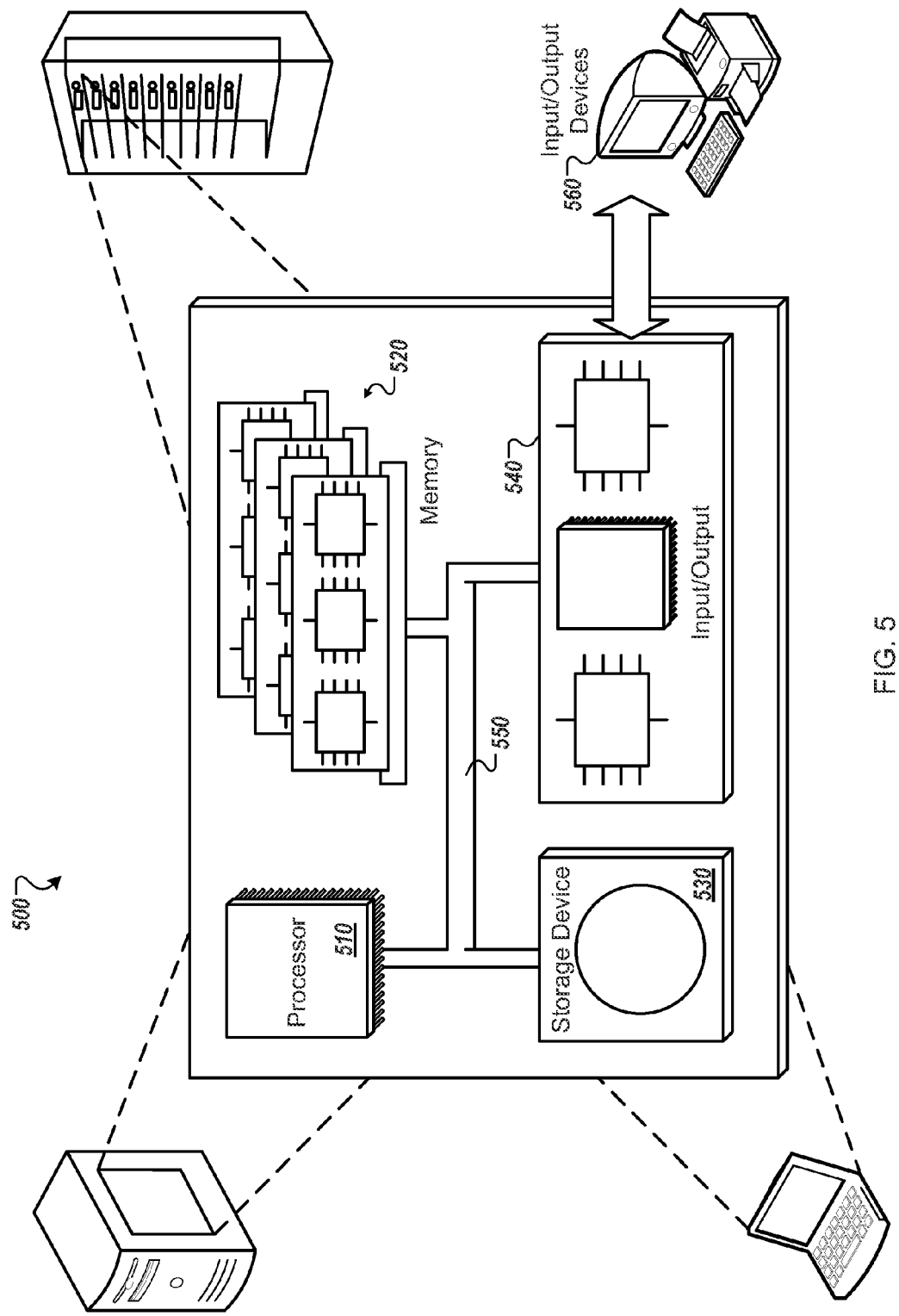
FIG. 5 is a block diagram of a programmable processing system.

An example of one such type of computer is shown in FIG. 5, which shows a block diagram of a programmable processing system 500 suitable for implementing apparatus or performing methods of various aspects of the subject matter described in this specification. The system 500 includes a processor 510, a random access memory (RAM) 520, a storage device 530, and an input/output (I/O) controller 540 coupled by a processor (CPU) bus 550. The system 500 can be preprogrammed, in ROM, for example, or it can be programmed (and reprogrammed) by loading a program from another source (for example, from a floppy disk, a CD-ROM, or another computer).

The storage device 530 suitable for storing executable computer programs, including programs embodying aspects of the subject matter described in this specification, and data including digital photographs, user identities, face area information, user relationships, affinity scores, quality scores, information that associates user identities with digital photographs, and other appropriate data.

The I/O controller 540 receives and transmits data (e.g., stills, pictures, movies, and animations for importing into a composition) in analog or digital form over communication links such as a serial link, local area network, wireless link, and parallel link.

Also coupled to the I/O controller 540 are output devices 560 which in various embodiments can include a display, a keyboard, a printer, and other input and output peripherals.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method, comprising:
   receiving, at a data processing apparatus, an identifier that identifies a first user;
   accessing, at the data processing apparatus, data defining relationships of the first user to second users;
   accessing, at the data processing apparatus, digital photographs;
   determining, by the data processing apparatus, digital photographs that are each associated with one or more of the first user and the second users;
   for each digital photograph, generating a photograph score based on the association with one or more of the first user and the second users and corresponding affinity scores representing the relationships of the first user to the second users;
   ordering the digital photographs according photograph scores; and providing, by the data processing apparatus, one or more of the digital photographs to a user device of the first user according to the order;

wherein generating the photograph score for each digital photograph comprises determining, for each relationship of the first user to a second user, an affinity score that measures the relationship of the first user to the second user based, in part, on a first value that is proportional to a first number of digital photographs of the first user tagged by the second user and a second value that is proportional to a second number of digital photographs of the second user tagged by the first user.

2. The computer-implemented method of claim 1, wherein:

determining digital photographs that are each associated with one or more of the first user and the second users comprises determining digital photographs that include images of one or more of the first user and second users; and generating a photograph score based on the association with one or more of the first user and the second users comprises generating the photograph score based on the images of first or second users that are determined to be included in the digital photograph and corresponding affinity scores representing the relationships of the first user to the second users.

3. The computer-implemented method of claim 1, wherein accessing data defining relationships of the first user to second users comprises:

accessing data defining a social circle that includes the first user and second users, wherein each second user is explicitly related to the first user by a relationship that is explicitly defined by the first user and the second user; and for each second user that is explicitly related to the first user:

accessing data defining a social circle that includes the second user and other second users, wherein each other second user is related to the second user by a relationship that is explicitly defined by the second user and the other second user.

4. The computer-implemented method of claim 1, wherein accessing data defining relationships of the first user to second users comprises accessing data defining a plurality of social circles of the user, each social circle defining:

a list of users that include one or more other than the user as a proper subset of users of a network; and a relationship of the user to the one or more other users;

wherein at least one social circle defines an explicit relationship of the first user to one or more second users and at least one social circle defines an implicit relationship of the first user to one or more second users.

5. The computer-implemented method of claim 4, wherein the explicit relationship is of a predefined relationship type in a social network.

6. The computer-implemented method of claim 5, wherein the implicit relationship based on user interactions between the first user and the second user.

7. The computer-implemented method of claim 1, wherein the affinity score that measures the relationship of the first user to the second user is further based, in part, on a time that each of the digital photographs of the second user tagged by the first user was generated.

8. The computer-implemented method of claim 1, wherein generating the photograph score for each digital photograph comprises determining, for each relationship of the first user to a second user, an affinity score that measures the relationship of the first user to the second user based, in part, on a value that is proportional to a number of digital photographs of the second user that the first user has tagged with the identity of the second user.

9. The computer-implemented method of claim 8, wherein the affinity score that measures the relationship of the first user to the second user is further based, in part, on a time that the first user tagged each of the digital photographs.

10. The computer-implemented method of claim 1, wherein the photograph score for each digital photograph comprises determining a combination of weighted affinity scores for all identified users for which a photograph interaction is identified and weights corresponding to the photograph interactions.

11. The computer-implemented method of claim 1, wherein the affinity score that measures the relationship of the first user to the second user is further based, in part, on a time that each of the digital photographs of the first user tagged by the second user was generated.

12. The computer-implemented method of claim 1, wherein generating the photograph score for each digital photograph comprises determining, for each relationship of the first user to a second user, an affinity score that measures the relationship of the first user to the second user based, in part, on a value that is proportional to a number of digital photographs in which images of the first user and the second user co-occur.

13. The computer-implemented method of claim 1, further comprising:

storing, in a digital photograph index, data identifying a subset of the digital photographs, the subset identifying only the digital photographs having photograph scores that exceed a score threshold and indexed to the identifier that identifies the user.

14. The computer-implemented method of claim 13, wherein the score threshold is the photograph score being one of a highest N photographs' scores, where N is a number that is less than a number of photograph scores generated for the user identifier.

15. The computer-implemented method of claim 1, further comprising:

storing, in a digital photograph index for each digital photograph, an association of the digital photograph with a plurality of user identifiers, wherein each user identifier is a user identifier for which a photograph score for the digital photograph exceeded a score threshold.

16. A tangible computer storage medium encoded with a computer program, the program comprising instructions that when executed by data processing apparatus cause the data processing apparatus to perform operations comprising:

receiving an identifier that identifies a first user;

accessing data defining relationships of the first user to second users;

accessing digital photographs;

determining digital photographs that are each associated with one or more of the first user and the second users;

for each digital photograph, generating a photograph score based on the association with one or more of the first user and the second users and corresponding affinity scores representing the relationships of the first user to the second users;

ordering the digital photographs according to the photograph scores; and providing one or more of the digital photographs to a user device of the first user according to the order;

wherein generating the photograph score for each digital photograph comprises determining, for each relationship of the first user to a second user, an affinity score that measures the relationship of the first user to the second user based, in part, on a first value that is proportional to a first number of digital photographs of the first user tagged by the second user and a second value that is proportional to a second number of digital photographs of the second user tagged by the first user.

17. The tangible computer storage medium of claim 16, wherein:
determining digital photographs that are each associated with one or more of the first user and the second users comprises determining digital photographs that include images of one or more of the first user and second users; and
generating a photograph score based on the association with one or more of the first user and the second users comprises generating the photograph score based on the images of first or second users that are determined to be included in the digital photograph and corresponding affinity scores representing the relationships of the first user to the second users.

18. The tangible computer storage medium of claim 16, wherein accessing data defining relationships of the first user to second users comprises:
accessing data defining a social circle that includes the first user and second users, wherein each second user is explicitly related to the first user by a relationship that is explicitly defined by the first user and the second user; and
for each second user that is explicitly related to the first user:
accessing data defining a social circle that includes the second user and other second users, wherein each other second user is related to the second user by a relationship that is explicitly defined by the second user and the other second user.

19. The tangible computer storage medium of claim 16, wherein accessing data defining relationships of the first user to second users comprises accessing data defining a plurality of social circles of the user, each social circle defining:
a list of users that include the user and one or more other users as a proper subset of users of a network; and
a relationship of the user to the one or more other users;
wherein at least one social circle defines an explicit relationship of the first user to one or more second users and at least one social circle defines an implicit relationship of the first user to one or more second users.

20. The tangible computer storage medium of claim 19, wherein the explicit relationship is of a predefined relationship type in a social network.

21. The tangible computer storage medium of claim 20, wherein the implicit relationship based on user interactions between the first user and the second user.

22. The tangible computer storage medium of claim 16, wherein the affinity score that measures the relationship of the first user to the second user is further based, in part, on a time that each of the digital photographs of the second user tagged by the first user was generated.

23. The tangible computer storage medium of claim 16, wherein generating the photograph score for each digital photograph comprises determining, for each relationship of the first user to a second user, an affinity score that measures the relationship of the first user to the second user based, in part, on a value that is proportional to a number of digital photographs of the second user that the first user has tagged with the identity of the second user.

24. The tangible computer storage medium of claim 23, wherein the affinity score that measures the relationship of the first user to the second user is further based, in part, on a time that the first user tagged each of the digital photographs.

25. The tangible computer storage medium of claim 16, wherein the affinity score that measures the relationship of the first user to the second user is further based, in part, on a time that each of the digital photographs of the first user tagged by the second user was generated.

26. The tangible computer storage medium of claim 16, wherein generating the photograph score for each digital photograph comprises determining, for each relationship of the first user to a second user, an affinity score that measures the relationship of the first user to the second user based, in part, on a value that is proportional to a number of digital photographs in which imagines of the first user and the second user co-occur.

27. The tangible computer storage medium of claim 16, further comprising:
storing, in a digital photograph index, data identifying a subset of the digital photographs, the subject identifying only the digital photographs having photograph scores that exceed a score threshold and indexed to the identifier that identifies the user.

28. The tangible computer storage medium of claim 27, wherein the score threshold is the photograph score being one of a highest N photographs' scores, where N is a number that is less than a number of photograph scores generated for the user identifier.

29. A system, comprising:
a data processing apparatus comprising at least one processor; and
a computer memory in data communication with the data processing apparatus and storing instructions that when executed by data processing apparatus cause the data processing apparatus to perform operations comprising:
receiving an identifier that identifies a first user;
accessing data defining relationships of the first user to second users;
accessing digital photographs;
determining digital photographs that are each associated with one or more of the first user and the second users;
for each digital photograph, generating a photograph score based on the association with one or more of the first user and the second users and corresponding affinity scores representing the relationships of the first user to the second users;
ordering the digital photographs according to the photograph scores; and
providing one or more of the digital photographs to a user device of the first user according to the order;
wherein generating the photograph score for each digital photograph comprises determining, for each relationship of the first user to a second user, an affinity score that measures the relationship of the first user to the second user based, in part, on a first value that is proportional to a first number of digital photographs of the first user tagged by the second user and a second value that is proportional to a second number of digital photographs of the second user tagged by the first user.

* * * * *